(12) United States Patent
Giolitti et al.

(10) Patent No.: US 7,473,353 B2
(45) Date of Patent: Jan. 6, 2009

(54) FUEL FILTER OF AN INTERNAL COMBUSTION ENGINE

(75) Inventors: Riccardo Carlo Giolitti, Turin (IT); Dierk Hoffmann, Stuttgart (DE); Thomas Weiser, Aspach (DE)

(73) Assignee: Mahle Filtersysteme GmbH, Stuttgart (DE)

( * ) Notice: Subject to any disclaimer, the term of this patent is extended or adjusted under 35 U.S.C. 154(b) by 50 days.

(21) Appl. No.: 10/580,931

(22) PCT Filed: Aug. 31, 2005

(86) PCT No.: PCT/DE2005/001519

§ 371 (c)(1), (2), (4) Date: May 30, 2006

(87) PCT Pub. No.: WO2006/024280

PCT Pub. Date: Mar. 9, 2006

(65) Prior Publication Data

US 2007/0114160 A1 May 24, 2007

(30) Foreign Application Priority Data

Sep. 1, 2004 (DE) .................. 10 2004 042 245

(51) Int. Cl.
*F02M 37/22* (2006.01)

(52) U.S. Cl. ................ 210/86; 210/167.01; 210/299; 210/416.4

(58) Field of Classification Search .............. 210/86, 210/114, 129, 299, 416.4, 167.01
See application file for complete search history.

(56) References Cited

U.S. PATENT DOCUMENTS

| | | | |
|---|---|---|---|
| 4,637,351 A | 1/1987 | Pakula | |
| 4,898,140 A | 2/1990 | Pages | |
| 6,444,121 B1 * | 9/2002 | Maxwell | 210/172.1 |
| 6,514,404 B1 | 2/2003 | Bauer | |
| 6,783,665 B1 | 8/2004 | Girondi | |

FOREIGN PATENT DOCUMENTS

| | | |
|---|---|---|
| DE | 3600669 A1 | 7/1986 |
| DE | 3709883 C2 | 10/1987 |
| DE | 4409570 A | 5/1995 |
| DE | 19847999 A | 4/2000 |
| DE | 10302057 A1 | 7/2004 |
| GB | 2129329 A | 5/1984 |
| WO | WO0027500 A | 5/2000 |
| WO | WO0133069 A | 5/2001 |
| WO | WO0194773 A | 12/2001 |
| WO | WO03067068 A | 8/2003 |

OTHER PUBLICATIONS

International Search Report, not dated.

* cited by examiner

*Primary Examiner*—Terry K Cecil
(74) *Attorney, Agent, or Firm*—Collard & Roe, P.C.

(57) ABSTRACT

A fuel filter of an internal combustion engine has a filter housing in which water separated from the fuel may collect within the filter so as to permit collection of the largest possible quantity of separated water in the smallest possible overall volume. This fuel filter has a liquid line which leads out of an area of the filter housing that is exposed to fuel and in which separated water can settle out due to gravity into a water collecting chamber situated outside the filter housing. There is also an upper area of the water collecting chamber which is connected by a connecting line mounted there to a fuel delivery line of the internal combustion engine.

8 Claims, 1 Drawing Sheet

FUEL FILTER OF AN INTERNAL COMBUSTION ENGINE

CROSS REFERENCE TO RELATED APPLICATIONS

Figure 1:
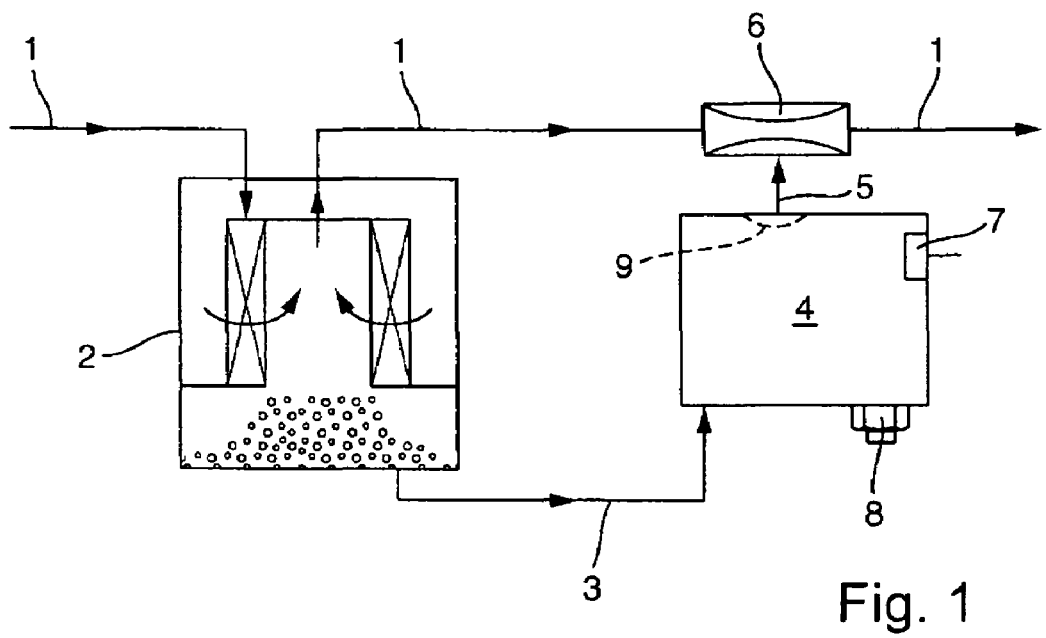

Applicants claim priority under 35 U.S.C. §119 of German Application No. 10 2004 042245.1 filed Sep. 1, 2004. Applicant also claims priority under 35 U.S.C. §365 of PCT/DE2005/001519 filed Aug. 31, 2005. The international application under PCT article 21 (2) was not published in English.

The invention relates to a fuel filter for an internal combustion engine.

In diesel fuel filters in particular, water present in the fuel is usually separated, collected in a chamber inside and at the bottom of the filter housing and then drained out after reaching a predetermined collecting volume. It is possible to collect water that is separated in a lower filter housing area because water has a higher specific gravity than fuel and therefore settles out below the fuel if it has previously coagulated within the filter in the form of separable droplets. The required droplet formation may be induced and/or increased within the filter by special essentially known water separation measures.

To ensure that the collected water is drained off, the volume of water settling in the lower chamber of a fluid filter is detected in known filters.

To prevent drainage of water collected at the bottom of a filter, British Patent GB 21 29 329 B describes suction removal of collected water in an extremely low volume flow through a venturi nozzle provided in the air intake line of the internal combustion engine and then adding it to the intake air supplied to the combustion process. Similar devices are known from German Patent 36 00 669 A1 and U.S. Pat. No. 4,637,351 A.

WO 03 067 068 A1 describes a fuel filter device in which water collected in a lower area of the fuel filter can flow into a water collecting chamber that is separate from the filter. Together with water, fuel flowing more or less unavoidably out of the filter may flow back out of the water collecting chamber, where it separates at the top, into the tank. The fuel flowing back into the tank must be additionally conveyed in a type of secondary circuit to the fuel conveyed in the usual way for the internal combustion engine.

The present invention relates to the problem of creating a large water collecting volume in a generic fuel filter without thereby increasing the overall volume of the filter beyond the extent that it would assume without a water collecting chamber and on the other hand increasing the usual fuel volume flow to be delivered for operation of the combustion engine by means of, for example, a secondary fuel circuit, e.g., of the type required with the device according to WO 03 067 068 A1 discussed above.

This problem is solved by a generic fuel filter according to the present invention.

Advantageous and expedient embodiments are also the object of the invention.

The invention is based on the general idea of transporting the separated water out of the filter housing and into a water collecting chamber that is separate from the filter and doing so in the simplest possible way during operation of the engine. For the case when the fuel flows through the fuel filter under pressure, it may already be sufficient for the water collecting chamber to be situated separately from the fuel filter in a throttled connecting line between the bottom of the fuel filter and an intake line into the fuel delivery line downstream from the fuel filter. In the case of a fuel filter through which fuel is drawn, however, a pump is obligatorily required in the aforementioned connecting line between the fuel filter and the fuel conveyor line. Such a pump may optionally also be used in a fuel filter through which the fuel is conveyed according to the first case mentioned above. A venturi nozzle is a particularly suitable example of a pump or suction device. The water collecting chamber may be situated at any distance away from the fuel filter where there is enough installation space for a relatively large water collecting volume.

An inventive venturi nozzle is assigned to the fuel delivery line through which the fuel is supplied to the combustion chambers of the internal combustion engine, at least a substream of this fuel flow passing through this line. The fluid intake by the venturi nozzle from the water collecting chamber should be only fuel. To this end, the water collecting chamber, which is separated from the filter, is flooded with fuel in the first startup of operation of the internal combustion engine or after a filter change. This flooding is performed in the same way as the flooding of the fuel filter and is usually referred to as "bleeding the fuel filter."

If the fuel filter and the water collecting chamber which is separate from it but is connected by line to the filter are flooded with fuel, water separated in the filter is collected as described below.

Within the fuel filter, which is designed for water separation in the usual way, water separated on the clean side, for example, settles out at the bottom of the filter housing. In engine operation, fuel is drawn out of an upper area of the water collecting chamber through the venturi nozzle assigned to the fuel delivery line and is preferably removed continuously. This necessarily withdraws an equal volume flow from the bottom of the fuel filter. Fuel withdrawn from the bottom of the filter housing along with the water necessarily separates at the top in the water collecting chamber due to its lower specific gravity in comparison with water. This ensures that only fuel and not water will be taken in by the delivery pump, which is designed as a venturi nozzle in particular.

Essentially it is possible to withdraw water from the bottom of the fuel filter both continuously and discontinuously. In removing the separated water from the fuel filter, it is important for the "droplet shape" of the separated water not to be lost in its withdrawal from the filter because otherwise there could be a backmixing of water and fuel, which should absolutely be avoided, in the water collecting chamber which is separated from the filter. Such a backmixing would occur if the water were no longer in a sufficiently large "droplet form" in which a separation between water and fuel occurs due to the difference in specific gravities. In continuous operation, i.e., continuous suction removal of a volume flow from the filter, the size of the volume flow withdrawn should be selected to ensure that water separated during engine operation within the filter can be removed without a back up of water within the filter.

In discontinuous operation, it is necessary to ensure that the volume of water separated in the filter does not exceed a certain preselectable extent. This may be accomplished, for example, by a water level sensor provided on the filter.

For both continuous and discontinuous operation, the water collecting chamber must be provided with a water level sensor to ensure that the water is evacuated from the collecting chamber before there is risk of it entering the connecting line leading to the venturi nozzle.

To remove the water from the collecting chamber, design measures may be provided such as those already known in general with water collecting chambers that are integrated directly into the fuel filter housing. An especially simple measure consists of providing a discharging screw in the bottom area of the collecting chamber.

A particularly advantageous exemplary embodiment, which is explained in greater detail below, is depicted in the drawing.

In this drawing, there is only one FIGURE, which shows:

FIG. 1 a schematic diagram of a fuel filter with a water collecting chamber situated at a distance from it.

A fuel filter 2 through which the fuel flows is provided in a diesel fuel delivery line 1. Fuel is drawn through the fuel filter in this exemplary embodiment.

A liquid line 3 leads from the bottom of this fuel filter 2 into a water collecting chamber 4 designed as a tank. This fluid line 3 is connected to the water collecting chamber 4 such that it opens there approximately in the lower bottom area. A connecting line 5 leads from an upper area of the water collecting chamber 4 through a venturi nozzle 6 provided in the fuel delivery line 1 and into the flow chamber of the fuel delivery line 1.

The water collecting chamber 4 may be mounted at any distance from the fuel filter 2 and may be in a position above the lower area of the fuel filter 2 where water separated in the fuel filter 2 settles out due to gravity. Such an independence of position makes it possible for the delivery pump, which is designed as a venturi nozzle 6, to convey the liquid withdrawn in the bottom area of the fuel filter 2 to higher levels with no problem.

In the upper area of the water collecting chamber 4, a water level sensor 7 is provided. A conventional drain screw 8 through the operation of which water can be drained out of the water collecting chamber 4 is provided in the bottom area of the water collecting chamber. A protective device 9 may be provided in the area where the connecting line 5 is connected to the water collecting chamber 4, said protective device being provided to ensure that only fuel and no water can enter into the connecting line 5.

The device described above can be operated as described below.

Before initial operation of an internal combustion engine, the fuel filter 2 and the water collecting chamber 4 are flooded with fuel. This is done in the customary manner for bleeding a fuel filter 2 in a diesel engine. If the fuel filter 2 and the water collecting chamber 4 have been completely flooded, then initially there will only be fuel in the water collecting chamber 4 during startup of operation of the engine.

In continuous operation of the inventive device, the venturi nozzle 6 is designed for a suction power sufficient to ensure that enough fluid will always be withdrawn from the fuel filter 2 through the liquid line 3 so that water cannot back up due to water separated in the fuel filter 2. Preventing a water backup in this sense means that, at least on the average, enough water must always be removed through the line 3 as it is separated from the fuel inside the filter during operation of the engine. Separated water is removed with suction together with fuel through the fluid line 3 and introduced into the water collecting chamber 4. This fluid transport must take place in such a way that the "droplet state" of the water is maintained. Only in this way is it possible to ensure that the separation between fuel and water which is required in the water collecting chamber 4 does in fact occur due to the difference in specific gravities of these two fluids. If such separation is ensured by an appropriate design of the fluid line 3, then the fuel may settle in the upper area and the water in the lower area of the water collecting chamber 4. In this way, only fuel is always drawn through the connecting line 5 into the venturi nozzle 6 from the upper area of the water collecting chamber 4 until a state prevails in which there is practically no more fuel in the water collecting chamber 4. The limiting state in which there is no longer enough fuel inside the water collecting chamber 4 in its upper area to be drawn out without being mixed with water is monitored by the water level sensor 7 provided in the upper area of the water collecting chamber 4. If this critical limiting state is detected by the water-level sensor 7, then the water is to be removed from the water collecting chamber 4 in a manner conventional for diesel engines in vehicles and the water collecting chamber 4 is then to be flooded again with fuel.

With discontinuous operation of the device, which is also essentially possible per se, an additional water-level sensor is required in the fuel filter 2. On reaching a preselectable maximum water volume, said water level sensor activates a water drain into the water collecting chamber 4.

In the exemplary embodiment described here, the water separation takes place inside the fuel filter 2 on the clean end, which is why the fuel carried through the water collecting chamber 4 is conveyed here into the clean end of the fuel delivery line 1. In the case of water separation taking place on the unfiltered end in the fuel filter 2, fuel passing through the water collecting chamber 4 is of course also to be supplied to the fuel delivery line 1 on the unfiltered end of the fuel filter 2.

For the case when the fuel is not "drawn" but instead "forced" through the fuel filter, instead of the venturi nozzle 6, only a throttled fuel intake line from the connecting line 5 leading out of the water collecting chamber 4 into the fuel delivery line 1 can take place in the area of the venturi nozzle 6, which is then omitted.

All the features characterized in the description and in the following claims may be essential to the present invention either individually or in any desired form.

The invention claimed is:

1. A fuel filter (2) having a filter housing of an internal combustion engine in which water separated from the fuel may collect inside the filter (2), in which a liquid line (3) leads from an area of the filter housing, which is exposed to fuel and where water that is separated can settle out due to gravity, to a water collecting chamber (4) situated outside the filter housing, wherein
 a connection line (5) is configured to deliver separated fuel from an upper area of the water collection chamber (4) to an area of a fuel delivery line (1), that is downstream of the filter (2) and upstream of the internal combustion engine, to mix with fuel that has directly exited the filter (2).

2. The fuel filter according to claim 1,
 wherein a delivery pump is provided in the flow path between the filter housing and the fuel delivery line (1).

3. The fuel filter according to claim 2,
 wherein the delivery pump is designed as a venturi nozzle (6) provided inside the fuel delivery line (1) through which the connecting line (5) opens into the fuel delivery line (1).

4. The fuel filter according to claim 2,
 wherein the delivery performance of the delivery pump is designed for a fuel stream to be delivered continuously, wherein at least the amount of water—at least the average amount generated—which is separated within the filter during operation of the fuel filter (1) can be transported back out of the filter housing without backing up.

5. The fuel filter according to claim 1,
 wherein a closable outflow opening is provided in a bottom area of the water collecting chamber (4).

6. The fuel filter according to claim 1,
wherein a water level sensor (7) is situated in an upper area of the water collecting chamber (4).

7. The fuel filter according to claim 1,
wherein a water separation/retaining device is connected upstream from the connecting line (5), leading out of the water collecting chamber (4), in an area leading out of the water collecting chamber (4).

8. A fuel filter (2) having a filter housing of an internal combustion engine in which water separated from the fuel may collect inside the filter (2), in which a liquid line (3) leads from an area of the filter housing, which is exposed to fuel and where water that is separated can settle out due to gravity, to a water collecting chamber (4) situated outside the filter housing,
wherein
a connection line (5) is configured to deliver separated fuel from an upper area of the water collection chamber (4) to an area of a fuel delivery line (1), that is downstream of the filter (2) and upstream of the internal combustion engine, to mix with fuel that has directly exited the filter (2);
wherein a delivery pump is provided in the flow path between the filter housing and the fuel delivery line (1); and
wherein the delivery pump is designed as a venturi nozzle (6) provided inside the fuel delivery line (1) through which the connecting line (5) opens into the fuel delivery line (1).

* * * * *